United States Patent
Sanchez Gomez

(10) Patent No.: US 6,711,459 B1
(45) Date of Patent: Mar. 23, 2004

(54) AUTOMATIC STORAGE SYSTEM, ESPECIALLY FOR VEHICLES

(76) Inventor: Gines Sanchez Gomez, Calle Cervantes, 1, 7, B, Mostoles (Madrid) (ES), 28.932

( * ) Notice: Subject to any disclaimer, the term of this patent is extended or adjusted under 35 U.S.C. 154(b) by 158 days.

(21) Appl. No.: 09/913,300

(22) PCT Filed: Jul. 3, 2000

(86) PCT No.: PCT/ES00/00082

§ 371 (c)(1),
(2), (4) Date: Aug. 13, 2001

(87) PCT Pub. No.: WO00/53518

PCT Pub. Date: Sep. 14, 2000

(30) Foreign Application Priority Data

Mar. 8, 1999 (ES) .......................................... P 9900503

(51) Int. Cl.[7] ........................... G06F 7/00; B65G 47/10; B65G 47/46

(52) U.S. Cl. .................... 700/214; 700/215; 198/369.1; 414/331.03

(58) Field of Search ................................ 700/214, 213, 700/215; 414/331.03, 277, 659; 198/347.3, 369.1

(56) References Cited

U.S. PATENT DOCUMENTS

| | | | | |
|---|---|---|---|---|
| 4,428,708 A | * | 1/1984 | Burt | 700/214 |
| 5,422,861 A | * | 6/1995 | Stringer et al. | 367/99 |
| 5,641,259 A | * | 6/1997 | Perry et al. | 414/268 |
| 5,740,060 A | * | 4/1998 | Mishina | 700/214 |
| 5,757,650 A | * | 5/1998 | Yamashita et al. | 700/214 |
| 5,793,633 A | * | 8/1998 | Noguchi et al. | 700/214 |
| 5,863,172 A | * | 1/1999 | Pearson et al. | 414/331.03 |
| 5,903,457 A | * | 5/1999 | Chang | 700/213 |
| 5,953,234 A | * | 9/1999 | Singer et al. | 700/214 |
| 5,964,562 A | * | 10/1999 | Bernard et al. | 414/331.03 |

FOREIGN PATENT DOCUMENTS

| | | |
|---|---|---|
| DE | 19809291 | 9/1999 |
| EP | 0089847 | 9/1983 |
| EP | 0457938 | 11/1991 |
| EP | 0646421 | 4/1995 |
| ES | 2011974 | 6/1990 |
| FR | 1584342 | 12/1969 |
| FR | 2525570 | 10/1983 |
| FR | 2672551 | 8/1992 |
| GB | 2063183 | 6/1981 |
| WO | WO 9714578 | 4/1997 |

* cited by examiner

Primary Examiner—Gene O. Crawford

(57) ABSTRACT

The invention relates to a system for storing and handling merchandise that can be managed by a computer and carried in a vehicle. Said system enables totally automated loading and transfer and highly automated unloading. When used in vehicles, said system consists of a conveyor belt loader that rejects inadequate merchandise, superimposed conveyor belts, which can have a belt with several turns, elevator, merchandise pushing device, photoelectric cells, label scanners, and the necessary connections for a computer controlling said devices, in addition to a fixing system consisting of an inflatable elastic band.

6 Claims, 6 Drawing Sheets

AUTOMATIC STORAGE SYSTEM, ESPECIALLY FOR VEHICLES

CROSS-REFERENCE TO RELATED APPLICATIONS

U.S. Pat. No. 5,740,060, Mishina. A storing and materials handling facility comprising two communication cables and a branch interface such that if interference in one of the cables, the information control data is transmitted by the other.

U.S. Pat. No. 4,428,708, Burt. An automatic storage and retrieval system including storage bin.

U.S. Pat. No. 5,953,234, Singer et al. An automated storage facility including a storage and retrieval system and a floor inventory management system.

BACKGROUND OF THE INVENTION

1. Fields of the Invention

The invention concerns a merchandise storage/manipulation system suitable for being computer-controlled and installed in a vehicle. The system enables wholly automatic loading and transferring, as well as quasi-automatic unloading.

2. Background Art

This invention is inspired in the closed conveyor belt of the airport, that are used to transport luggages.

BRIEF SUMMARY OF THE INVENTION

A system, suitable for being computer-controlled, that enables both the storage and the recovery of merchandise previously stowed in barcode-tagged parcels, having interconnected several closed conveyor belts or cyclical elevators.

There are three kinds of conveyor belts: storage, interconnection, and feed belts, the latter lineal. The elevator, however, will always act as interconnection. Each interconnection belt is provided with a minimum number of intakes and/or outputs equal to the number of storage belts connected to it, plus one intake and/or output more for the communication with the outside or with other interconnection devices. Storage belts only comprise one intake and/or output.

Each intake to a belt comprises an access for the merchandise provided with a detection device that, any time it acknowledges an incoming parcel starts the belt automatically; a photoelectric cell; and, immediately after it, a tag reader. As the photoelectric cell detects the incoming parcel, it sends a signal causing the computer to activate a time-input. Once the parcel has gone past, a new signal is sent to the computer, which activates a second time-input. After the tag reader sends a 'correct reading' message, the computer registers the entry and storage of the parcel and determines the storage length by multiplying the time difference between the two signals from the cell by the speed of the belt.

In order to release the merchandise from a belt, each outlet is provided with a pusher or a ramp, preceded by a tag reader, a photoelectric cell, and a device detecting if there is any merchandise blocking the exit. Every time a parcel is to leave the system, the belt rotates until it passes by the cell and the tag reader. Once the photoelectric cell is de-activated and the tag reader detects the parcel, the belt stops, and the pusher or the ramp is turned on, provided that there is no merchandise blocking the exit.

The elevator moves non-stop upwards-downwards, until its wipers contact an active outlet flip-flop indicating that there is merchandise waiting.

The system may be fed manually, by placing the parcels on an intake, or automatically, through a special feed device. In this case, the connection is performed by means of a non-closed conveyor belt placed between the system's intake and the outlet of the feed device. This conveyor belt is provided with clearance gauge devices, a divertor, and an auxiliary belt, perpendicular to the feed belt, for all rejected merchandise. The clearance gauge devices are responsible for detecting any merchandise whose width and height exceed the acceptable values. If this happens, they will activate the divertor, which will re-direct the rejected merchandise to the perpendicular auxiliary belt.

DETAILED DESCRIPTION OF THE INVENTION

The system is shaped by the interconnection of several closed conveyor belts with other closed belts or cyclical elevators acting as the closed belts by the performance of an upwards/downwards cyclical movement.

Figure 1:
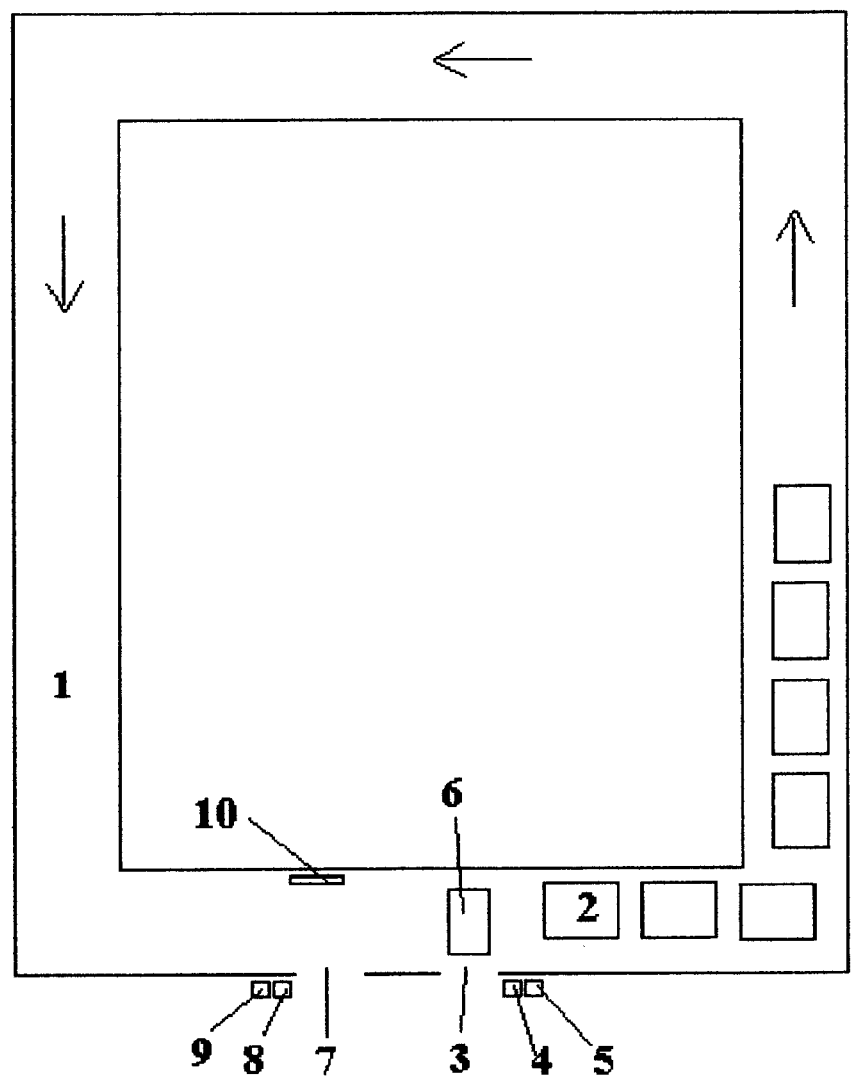
FIG. 1. General scheme of a storage system with single-level and multiple-level, with feed belts, an interconnection belt, interconnection elevators and storage belts.

FIG. 1. There are three kinds of conveyor belts: storage 7, 8, interconnection 1, and feed belts 2, the latter not needing to be closed. The elevator 9, however, will always act as interconnection. Each interconnection belt must be provided with a minimum number of intakes 3, 5, 6 and/or outputs 4, 5, 6 equal to the number of storage belts connected to it 8, plus one intake and/or output more for the communication with the outside 3, 4 or with other interconnection devices 5.

Figure 2:
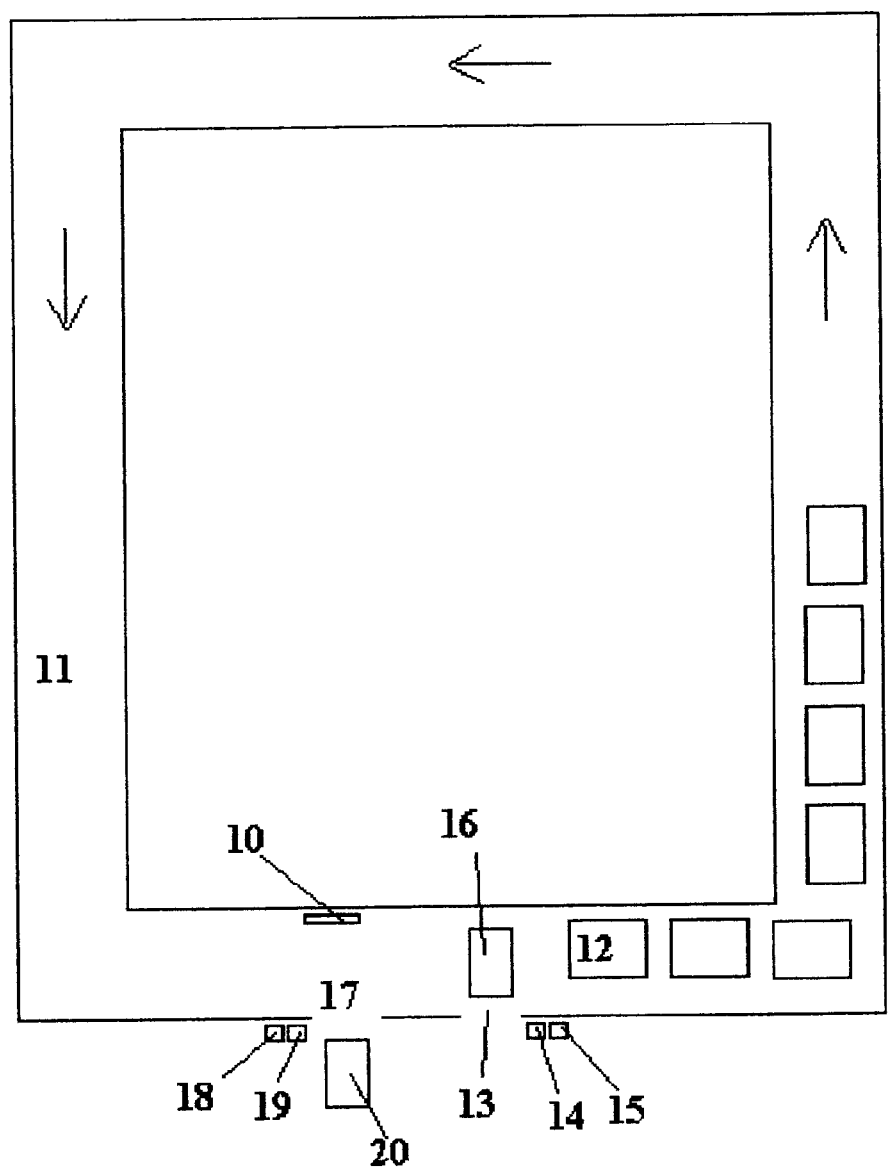
FIG. 2. Storage belt with an input and an output.

FIG. 2. Storage belts shall only comprise one intake and/or output 13, 17.

Each intake comprises: an access for the merchandise 13 provided with a detection device 16 that, any time it acknowledges an incoming parcel (a switch to be activated by the parcels as they go in, a photoelectric cell, or a connection with a preceding feed device, which will send a signal every time a parcel is being transferred), starts the belt automatically; a photoelectric cell 14 ; and, immediately after it, a tag reader 15. As the photoelectric cell detects the incoming parcel 12, it sends a signal causing the computer to activate a time-input. Once the parcel has gone past, a new signal is sent to the computer, which activates a second time-input. After the tag reader sends a 'correct reading' message, the computer registers the entry and storage of the parcel and determines the storage length by multiplying the time difference between the two signals from the cell by the speed of the belt. If a belt is to receive merchandise from an elevator, an entry flip-flop (see FIG. 5, simbols 23 and 23b) are installed. The flip-flop (through wipers, infrared rays . . . ) is responsible for informing the elevator when the belt is awaiting merchandise.

In order to release the merchandise from the system, each outlet 17 must be provided with a pusher or a ramp 10, preceded by a tag reader 19, a photoelectric cell 18, and a blockage detector 20 (for example, a sonar) detecting if there is any merchandise blocking the exit. Every time a parcel is to leave the system, the belt 11 rotates until it passes by the cell and the tag reader. Once the photoelectric cell 19 is de-activated and the tag reader 18 detects the parcel, the belt 11 stops, and the pusher or the ramp 10 is turned on, provided that there is no merchandise blocking the exit. In case the merchandise is to be released through an elevator, a lock system must be installed at the outlet (see FIG. 5, simbols 24 and 24b). This lock system, based on a simple switch that is turned on when the elevator presses it, will prevent the pusher or the ramp from starting before the elevator is in position. The outlet also is provided with a flip-flop (see FIG. 5, simbols 23 and 23b) capable of informing the elevator when the merchandise is ready for departure. This flip-flop transmits its state to the elevator by a connection ( as wipers, infrared rays . . . ). In this case, no blockage detector is required.

Figure 3:
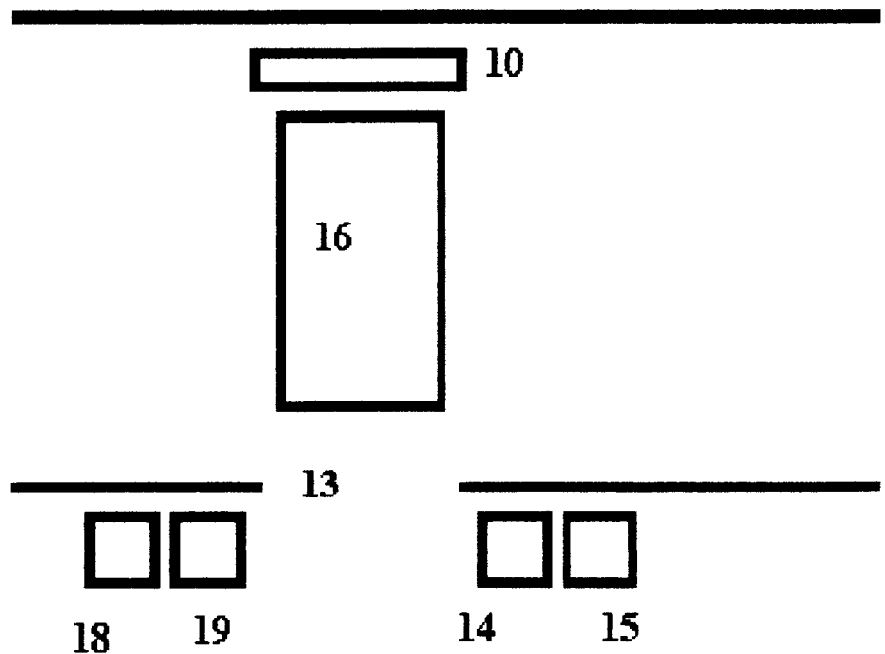
FIG. 3. Input/output sharing a same location.

FIG. 3. An intake and an outlet can share a same location 13, provided that the above-mentioned devices are arranged in the following order: outlet's photoelectric cell, and tag reader 18, 19, free space 13 (for the entry detector 16, for the pusher 10 or any other ejection device whatsoever, for the blockage detector, or for any communication device for the elevator, if necessary), and intake's photoelectric cell and tag reader 14, 15.

Figure 4:
FIG. 4. Interconnection elevator. Lateral view.

FIG. 4. The elevator comprises: a platform, which must be open at any of the sides where the merchandise is to go through; an elevation mechanism, programmed to originate a continuous upwards-downwards movement; a load detector 21 (for example, a weight spring); and appropriately positioned pushers 22.

Figure 5:
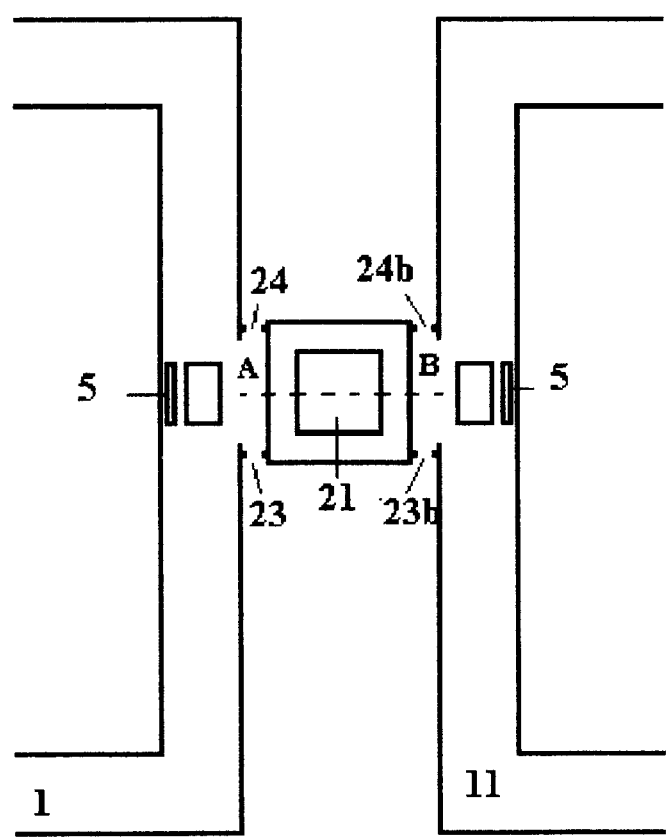
FIG. 5. Interconnection elevator. Horizontal view.

FIG. 5. When empty, the elevator moves non-stop upwards-downwards, until its wipers contact an active outlet flip-flop 23, 23b indicating that there is merchandise waiting. If the elevator does not carry any merchandise, it will stop and activate the switch of the lock system 24, 24b, which will enable the merchandise to be delivered to the elevator. The elevator will keep on moving until it contacts an active intake flip-flop. Then it will stop and, through its pushers, deliver the merchandise to the storage (or exit) device.

Figure 6:
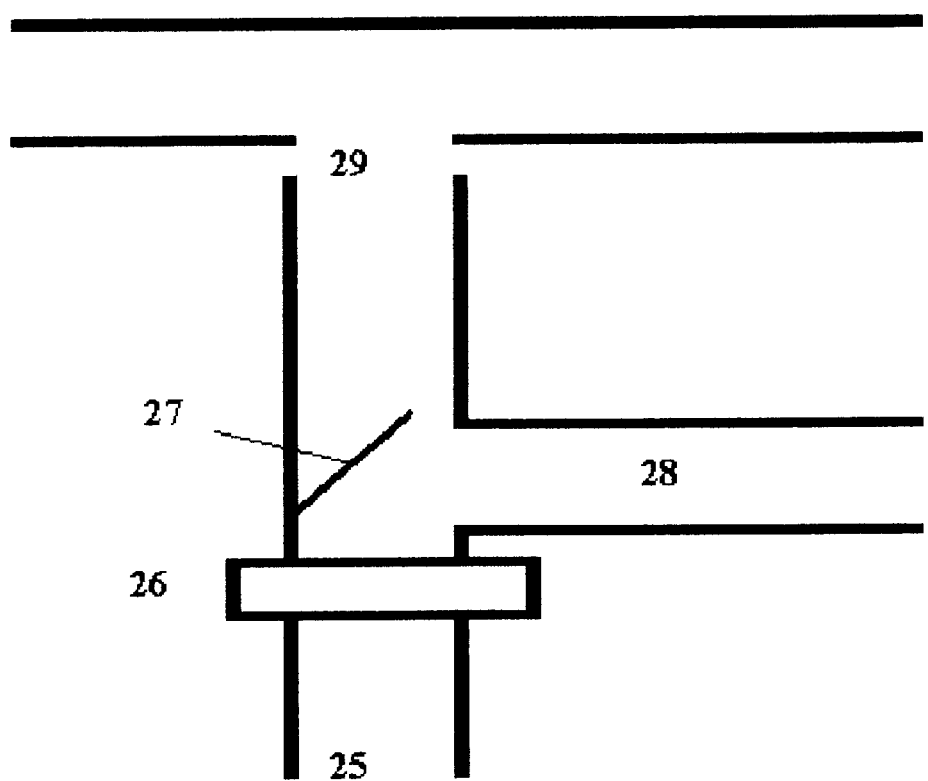
FIG. 6. Feed belt.

FIG. 6. The system may be fed manually, by placing the parcels on an intake, or automatically, through a special feed device (for example, an automatic vehicle or warehouse). In this case, the connection must be performed by means of a non-closed conveyor belt placed between the system's intake 25 and the outlet of the feed device 29. This conveyor belt is provided with clearance gauge devices 26, a divertor 27, and an auxiliary belt 28, perpendicular to the feed belt, for all rejected merchandise. The clearance gauge devices (photoelectric cells and/or sonars) are responsible for detecting any merchandise whose width and height (the length is controlled by the intake photoelectric cell) exceed the acceptable values. If this happens, they will activate the divertor, which will re-direct the rejected merchandise to the perpendicular auxiliary belt. If there is any parcel into the feed belt, no more parcels have to be allowed to go in. This can be controlled by a lock device, comprising, for example, a flip-flop to be activated as the merchandise enters the belt, and de-activated as it leaves the belt, either through the outlet or through the divertor.

Figure 7:
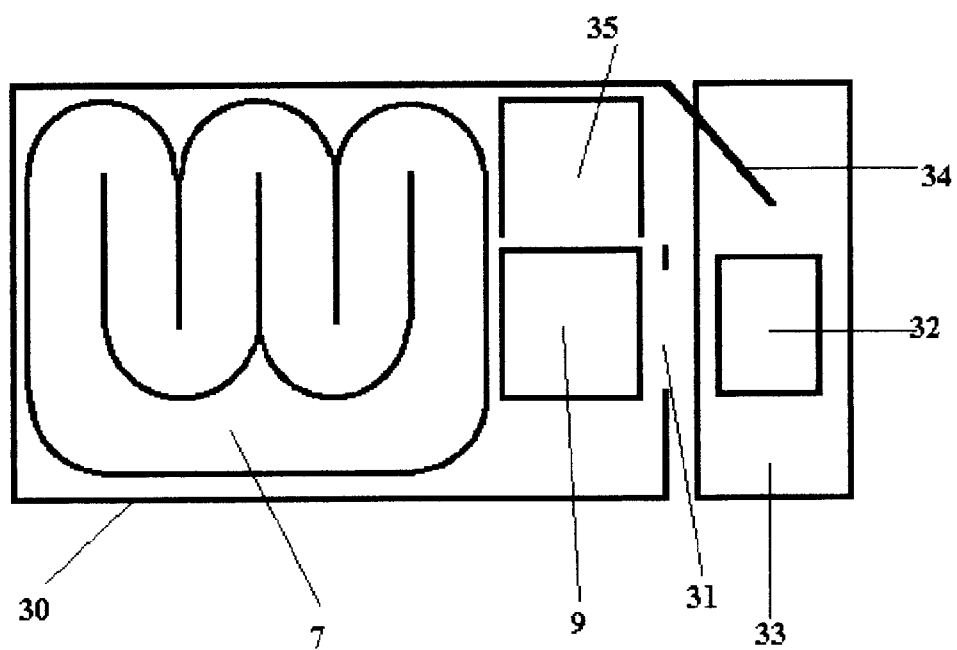
FIG. 7. Employment of the system for vehicles stowage/unstacking, with a elevator and a pile of storage belts.
Figure 1:
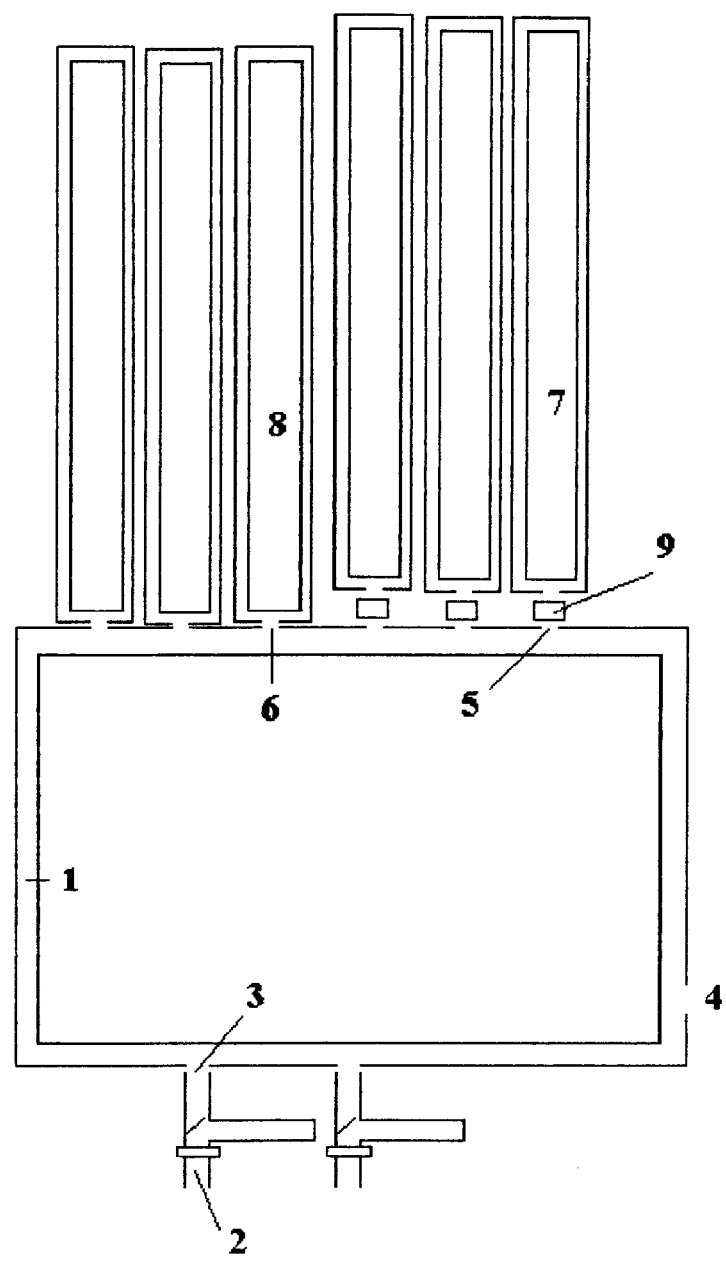

FIG. 7. The preferred use for this invention consists in the application of the system to a vehicle. The figure shows a lengthwise section of a lorry's body, in which: 30 depicts the lorry's body, with only one practicable door at its rear part; 7 depicts the storage belt, which has a sinuous shape in order to increase its loading capacity; 9 depicts the elevator; 31 depicts the elevator's feed trapdoor, installed at the blind door; 32 and 33 depict uplift trapdoors, which may be installed at the vehicle and constitute a reflection of the feed trapdoor; 34 depicts the rear door, from where merchandise is released; and 35 depicts the unloading cage, which either must be open at one its sides or must be suitable for being open by means of a folding or detachable side.

It is the feed trapdoor 31 that feeds the vehicle, either manually—parcel by parcel, or automatically—through a feed belt coming from the main warehouse, or through a common belt coming from another vehicle. During this operation, the vehicle can be closed, even with the uplift trapdoor. The elevator is used to unload the vehicle by depositing the parcels into the unloading cage. Once this cage is filled up, the driver removes it from the lorry and delivers it to the customer, which, in return, brings back a previously used empty cage.

The storage belts must be enclosed and provided, at its top and/or its sides, with protective pads made of rubber or any other elastic, watertight, and resistant material whatsoever. Such pads must be air-inflatable, so that they can fasten the merchandise against the belt when the vehicle is in motion. On the other hand, the features of these belts as storage elements have already been deeply described and, therefore, require no further explanation.

This system enables to use a single warehouse for the entire distribution of merchandise to final customers, both at the self-sale and at the sale by order formats. Thus, if we equip a fleet of light and heavy lorries with this system, we will be able to keep the light lorries away from the warehouse for long periods—even permanently—, since they may be supplied "en route" at any safe service area, where the merchandise would just be transferred through a conveyor belt, which may be protected, from one lorry to the other. This transfer operation would be, otherwise, computer-controlled.

What is claimed is:

1. A computer-controlled storage system for storing and recovering merchandise in barcode-tagged parcels, comprising closed storage belts, each storge belt having an intake and an outlet, cyclical interconnection elevators, each cyclical interconnection elevator having a load detector, pushers and wipers, said wipers related with flip-flops located at the inputs or outlets for stoping the elevator, lineal feed belts, each lineal feed belt being provided with clearance gauge devices, and a divertor to reject the merchandise that exceed an acceptable value.

2. The computer-controlled storage system of claim 1 wherein the outlet comprises a blockage detector for detecting if there is any merchandise blocking the outlet.

3. The computer-controlled storage system of claim 1 wherein the outlet comprises a lock system for preventing activating the pusher of the interconnection elevator before that the interconnection elevator presses said lock system.

4. The computer-controlled storage system of claim 1, characterized in that the intake and the outlet share a same location.

5. The computer-controlled storage system of claim 4 wherein the outlet comprises a blockage detector.

6. The computer-controlled storage system of claim 4 wherein the outlet comprises a lock system.

\* \* \* \* \*

UNITED STATES PATENT AND TRADEMARK OFFICE
CERTIFICATE OF CORRECTION

PATENT NO. : 6,711,459 B1
DATED : March 3, 2004
INVENTOR(S) : Sanchez Gomez, Gines It is certified that error appears in the above-identified patent and that said Letters Patent is hereby corrected as shown below:

Drawings,
Please replace Figure 1/6 with the attached 1/6.

Signed and Sealed this

Twenty-fourth Day of August, 2004

JON W. DUDAS
*Director of the United States Patent and Trademark Office*